(12) United States Patent
Harajiri

(10) Patent No.: US 7,829,818 B2
(45) Date of Patent: Nov. 9, 2010

(54) INK JET HEAD NOZZLE PLATE MANUFACTURING METHOD, INK JET HEAD NOZZLE PLATE MANUFACTURING APPARATUS, INK JET HEAD NOZZLE PLATE, INK JET HEAD, AND INK JET RECORDING APPARATUS

(75) Inventor: Toshihiko Harajiri, Chiba (JP)

(73) Assignee: SII Printek Inc. (JP)

( * ) Notice: Subject to any disclaimer, the term of this patent is extended or adjusted under 35 U.S.C. 154(b) by 976 days.

(21) Appl. No.: 11/502,179

(22) Filed: Aug. 9, 2006

(65) Prior Publication Data

US 2007/0064049 A1    Mar. 22, 2007

(30) Foreign Application Priority Data

Aug. 23, 2005   (JP)   ............... 2005-240724

(51) Int. Cl.
*B23K 26/38* (2006.01)
*B23K 26/06* (2006.01)

(52) U.S. Cl. ............... 219/121.71; 219/121.7; 219/121.75

(58) Field of Classification Search ............ 219/121.7, 219/121.71, 121.75, 121.77
See application file for complete search history.

(56) References Cited

U.S. PATENT DOCUMENTS

| | | | |
|---|---|---|---|
| 4,950,862 A | | 8/1990 | Kajikawa |
| 5,517,000 A | * | 5/1996 | Nishiwaki et al. ...... 219/121.77 |
| 5,666,722 A | * | 9/1997 | Tamm et al. ................ 29/847 |
| 6,239,914 B1 | * | 5/2001 | Nishiwaki ............... 219/121.71 |
| 6,285,001 B1 | * | 9/2001 | Fleming et al. ......... 219/121.73 |
| 6,444,949 B1 | | 9/2002 | Suzuki et al. |
| 6,625,181 B1 | | 9/2003 | Oshemkov et al. |
| 2001/0009251 A1 | * | 7/2001 | Sekizawa et al. ....... 219/121.73 |
| 2003/0217995 A1 | * | 11/2003 | Toyofuku et al. ...... 219/121.71 |

FOREIGN PATENT DOCUMENTS

| | | |
|---|---|---|
| EP | 0454152 A2 | 10/1991 |
| EP | 1065025 A2 | 1/2001 |
| EP | 1393911 A1 | 3/2004 |
| JP | 2002-283083 A * | 10/2002 |
| JP | 2005219069 A | 8/2005 |

* cited by examiner

*Primary Examiner*—Geoffrey S Evans
(74) *Attorney, Agent, or Firm*—Adams & Wilks

(57) ABSTRACT

In an ink jet head nozzle plate manufacturing method, a laser beam is generated using a laser beam source. A direction of the laser beam is changed using a mirror that reflects the laser beam. The laser beam reflected by the mirror is condensed using micro-lenses arranged on a common plane. Nozzle openings are formed in a nozzle plate using the laser beam condensed by the micro-lenses.

11 Claims, 8 Drawing Sheets

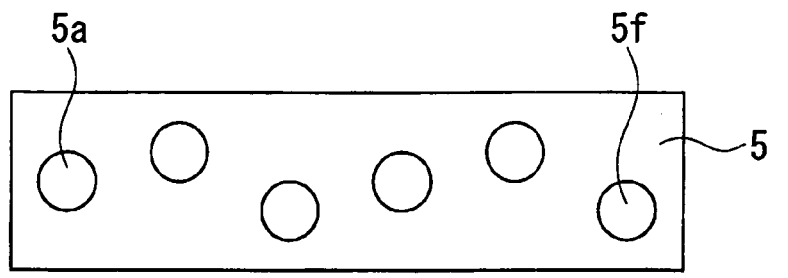
FIG. 8A
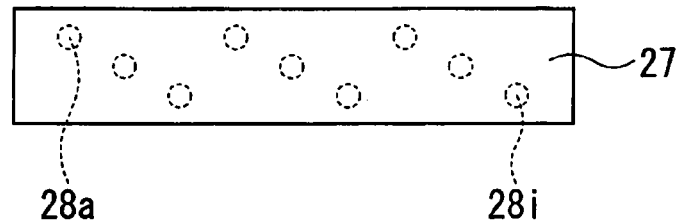
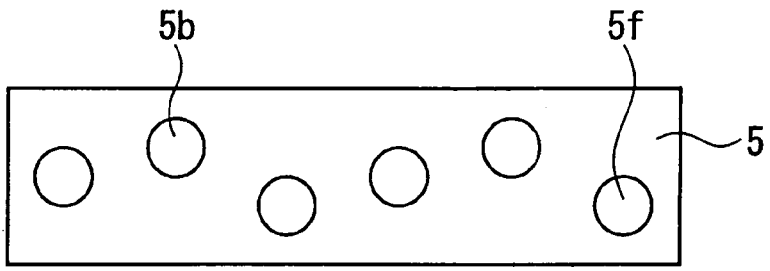
FIG. 8B
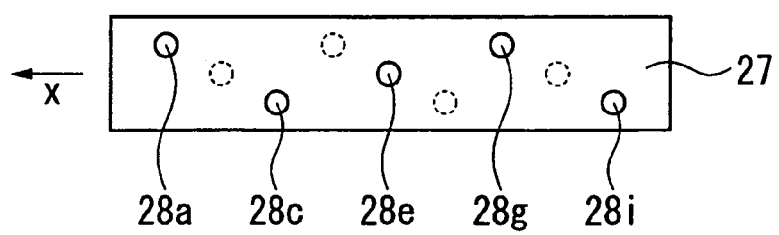
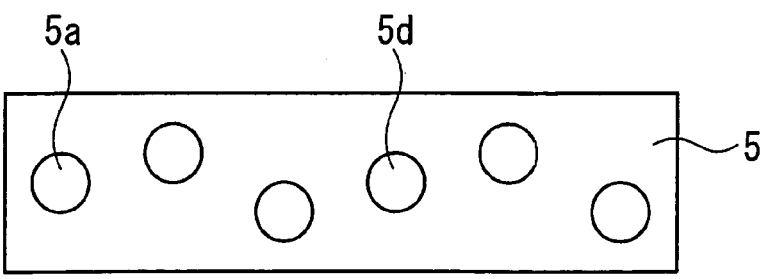
FIG. 8C
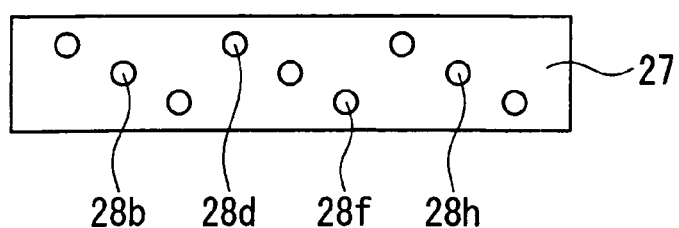

INK JET HEAD NOZZLE PLATE MANUFACTURING METHOD, INK JET HEAD NOZZLE PLATE MANUFACTURING APPARATUS, INK JET HEAD NOZZLE PLATE, INK JET HEAD, AND INK JET RECORDING APPARATUS

BACKGROUND OF THE INVENTION

1. Field of the Invention

The present invention relates to an ink jet recording apparatus that is applied, for example, for a printer or a facsimile machine, and to an ink jet head used for the ink jet recording apparatus, a nozzle plate used for the ink jet head, an apparatus for manufacturing the nozzle plate and a method for manufacturing the nozzle plate.

2. Related Background Art

An ink jet recording apparatus is known that records characters and images on a recording medium by employing an ink jet head wherein a plurality of ink chambers, made of a piezoelectric material for which a poling process has been performed, are arranged in parallel, and electrodes are mounted on two inner walls of the individual ink chambers, and wherein the piezoelectric material is deflected by selectively transmitting a drive pulse signal to these electrodes, and to thus discharge ink from a plurality of nozzle openings that communicate with the ink chambers.

This ink jet recording apparatus moves a carriage, on which the ink jet head is mounted, in the main scanning direction relative to the recording medium, and discharges ink from the nozzles of the ink jet head to print a dot pattern in a predetermined area. When one main scanning has been completed, the ink jet recording apparatus moves the recording medium a predetermined distance in the sub-scanning direction, and repeats the above described operation to print all the desired area. As ink jet recording apparatuses of this type, high image quality, low cost color printers have been produced for home use and for office use, and the number of units produced has been increasing, year by year.

In order to provide increased image quality for such an ink jet recording apparatus, an effective means is to reduce the discharge side diameters of nozzle openings that are formed in the nozzle plate of the ink jet head, and for the arrangement density of the nozzle openings to be increased. This is because the size of ink droplets can be decreased and the number of droplets that can be ejected at one time is multiplied. On the other hand, the diameters of the ink nozzle openings on the ink chamber side are large so that ink easily flows in. In other words, the inside of each nozzle opening formed in the nozzle plate is shaped so it tapers down to a circle having a small diameter on the discharge side (the ink outlet side) from a circle having a large diameter on the ink chamber side (the ink inlet side).

Since each of the nozzle openings is tapered, a further effect provided is that the speed at which ink is discharged is increased. And as the angle at which the nozzle openings are tapered becomes greater, an additional, corresponding increase in the ink discharge speed is obtained. However, when the angle of the taper becomes too great, a resulting problem is that ink discharged from a nozzle will either fly transversely or air will be sucked into the nozzle following the discharge of ink. Therefore, in order to ensure printing stability, the accurate formation of the tapered portion is important. And to provide high image quality, several hundreds of the above described nozzle openings must be stably, accurately formed at pitches of 70 to 300 μm.

Therefore, etching, injection molding, or a method that uses a laser beam is employed to accurately form nozzle openings. Above all, a method that employs an excimer laser beam to bore polymer, can quickly and appropriately, with an accuracy on the micro order, form holes or grooves at normal temperature, while under normal pressure, without thermal distortion or flash. Especially, since a laser beam that is passed through a mask is condensed by a lens and used for boring, tapered holes can be formed as described in Japanese Patent Laid-Open Application No. 2002-160371.

However, according to the technique described in Japanese Patent Laid-Open Application No. 2002-160371, wherein a laser beam is passed through a mask and is split into multiple beams that are thereafter condensed and passed through a single large lens to form a plurality of nozzle openings, as shown in FIG. 10, the laser beams passed, in this manner, through the portions of a lens 52 nearer the edges of the lens 52 are more affected by lens aberrations than are laser beams that are passed through the lens 52 near the center, and laser beam parallelism is deteriorated. Therefore, compared with nozzle openings 58P that have been bored by a laser beam passed through the lens 52 near the center, nozzle openings 58Q that have been bored by laser beams passed through the lens 52 nearer the edges will have shapes differing from that which is desired. Specifically, ink droplets discharged from the nozzle openings 58Q will not fly straight, and will land on a paper plane at an angle, degrading the printing quality. In order to avoid this problem, the laser beams must be passed through the lens 52 only near the center. Then, however, the number of nozzle openings 58 that can be formed at one time is reduced, and the processing efficiency is deteriorated when a large nozzle plate must be formed that has a total length equal to or greater than 20 mm.

SUMMARY OF THE INVENTION

While taking the above problems into account, one objective of the present invention is to provide a method for efficiently and stably manufacturing a nozzle plate wherein nozzle openings are accurately formed.

To achieve this objective, according to the present invention, provided is an ink jet head nozzle plate manufacturing method wherein a plurality of nozzle openings are formed by irradiating the upper face of a nozzle plate with a laser beam passed through multiple lenses, and wherein the lenses employed are a plurality of micro lenses arranged on the same plane. According to this method, a nozzle plate having a plurality of uniform nozzle openings can be manufactured without the formation of the nozzle openings being adversely affected by lens aberrations.

Further, according to the ink jet head nozzle plate manufacturing method of the invention, in a direction in which the micro lenses are arranged, a pitch between adjacent micro lenses is an integer multiple of a pitch between adjacent nozzle openings. With this arrangement, a sufficient amount of laser beams can be obtained, and nozzle openings having a desired shape can be formed.

Furthermore, according to the ink jet head nozzle plate manufacturing method of the invention, the integer multiple is two to four times, and in order to bore the nozzle openings, at the least, either the plurality of micro lenses or the nozzle plate is intermittently moved in the direction in which the micro lenses are arranged. With this arrangement, micro lenses having a comparatively large diameter can be used, and a satisfactory depth of field can be obtained. Accordingly, fine nozzle openings can be efficiently formed.

In addition, according to the ink jet head nozzle plate manufacturing method of the invention, the laser beam is an excimer laser beam. Thus, the nozzle openings can be efficiently formed in a polyimide nozzle plate.

According to the present invention, an ink jet head nozzle plate manufacturing apparatus comprises:

a plurality of micro lenses, located on the same plane between a laser beam source and a target object, for condensing a laser beam to form a plurality of nozzle openings; and a target object moving unit, for, at the least, moving the target object parallel to a direction in which the micro lenses are arranged, wherein, in the direction in which the micro lenses are arranged, a pitch between adjacent micro lenses is an integer multiple of a pitch between adjacent condensing positions on the face of the target object. With this arrangement, a nozzle plate can be manufactured that has a plurality of nozzle openings wherein desired tapered portions are accurately formed.

According to the invention, an ink jet nozzle plate manufacturing apparatus comprises: a micro lens array that includes a plurality of micro lens units provided in a direction in which micro lenses are arranged, wherein each micro lens unit is formed by shifting a plurality of micro lenses away from each other in a direction perpendicular to the direction in which the micro lenses are arranged. With this arrangement, a nozzle plate having a plurality of nozzle openings can be easily manufactured.

Moreover, according to the invention, provided is an ink jet head nozzle plate that is manufactured by employing this ink jet head nozzle plate manufacturing method. Therefore, an ink jet head nozzle plate can be provided that ensures ink will not be unevenly discharged through the nozzle openings.

Further, according to the invention, an ink jet head comprises:

a nozzle plate described above;

an ink jet head chip, on which a plurality of ink discharge actuators are provided, in parallel, that communicate with nozzle openings formed in the nozzle plate, and that are separated by side walls whereon electrodes are formed, on both sides; and a driver, for transmitting an actuator drive signal to the ink jet head chip. With this arrangement, an ink jet head can be provided that ensures ink will not be unevenly discharged through the nozzle openings.

According to the invention, an ink jet recording apparatus comprises:

an ink jet head described above;

an ink supply unit, for supplying ink to the ink jet head; and a recording medium conveying portion, for conveying a recording medium onto which ink is discharged by the ink jet head. As a result, the quality of an image provided for the recording medium can be improved.

As is described above, according to the ink jet head nozzle plate manufacturing method of the invention, the laser beam can be condensed at multiple locations on the face of a nozzle plate, and a plurality of uniform nozzle openings can also be efficiently formed on a large nozzle plate. Furthermore, the tapered portions of the nozzle openings can be accurately fabricated, and the provision of fine pitches for the nozzle openings is also enabled. Further, by employing the thus obtained nozzle plate, the uneven discharge of ink from the ink jet head can be prevented, and the quality of an image provided for a recording medium can be improved.

BRIEF DESCRIPTION OF THE DRAWINGS

FIGS. 8A to 8C are diagrams showing the process for machining the nozzle plate that employs the micro lens array;

DETAILED DESCRIPTION OF THE PREFERRED EMBODIMENTS

The preferred embodiments of the present invention will now be described in detail.

Figure 1:
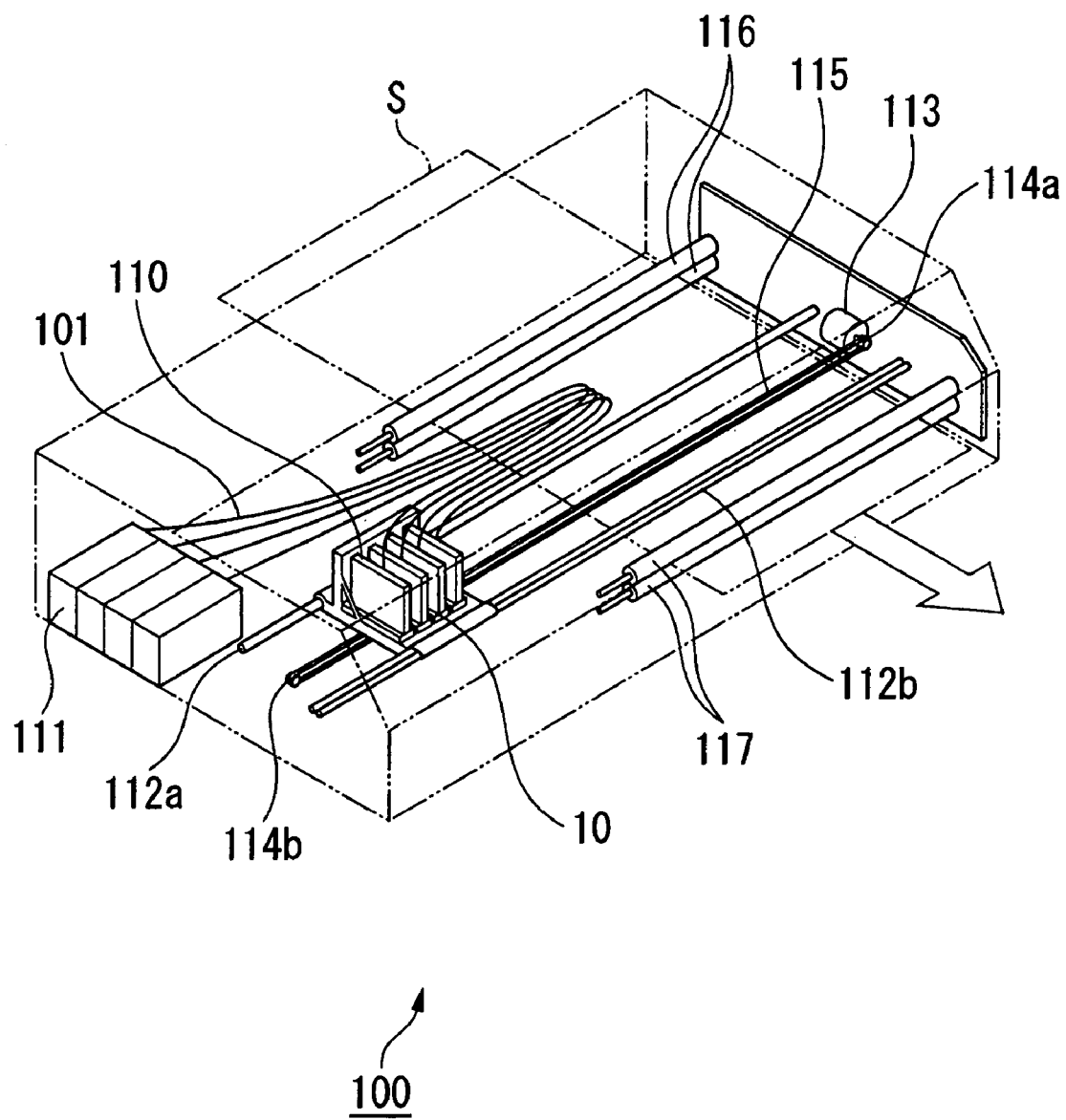
FIG. 1 is a schematic perspective view of an ink jet recording apparatus according to a first embodiment of the present invention.

FIG. 1 is a schematic perspective view of an ink jet recording apparatus. As shown in FIG. 1, an ink jet recording apparatus 100 for this embodiment includes: a plurality of ink jet heads 10 provided for individual colors; a carriage 110, wherein the ink jet heads 10 are mounted, in parallel, in the main scanning direction; and ink cartridges 111, for supplying ink through ink supply tubes 101, which are flexible tubes. The carriage 110 reciprocates along a pair of guide rails 112a and 112b in the direction of their long axis. A drive motor 113 is located at one end of the guide rails 112a and 112b, and the drive force exerted by the drive motor 113 is transmitted to a timing belt 115 that is extended between a pulley 114a, which is connected to the drive motor 113, and a pulley 114b, which is located at the other end of the guide rails 112a and 112b. The carriage 110, fixed at a predetermined position on the timing belt 115, is then moved.

Further, at both ends of a case indicated by a broken line, a pair of conveying rollers 116 and 117 are provided as conveying means along the guide rails 112a and 112b in a direction perpendicular to a direction in which the carriage 110 is moved. These conveying rollers 116 and 117 move a recording medium S downward relative to the carriage 110 in a direction perpendicular to the direction in which the carriage 110 is moved.

When the recording medium S is fed by the conveying rollers 116 and 117, while at the same time scanning is performed by moving the carriage 110 in the perpendicular direction, characters and images are printed on the recording medium S by the ink jet head 10.

Figure 2:
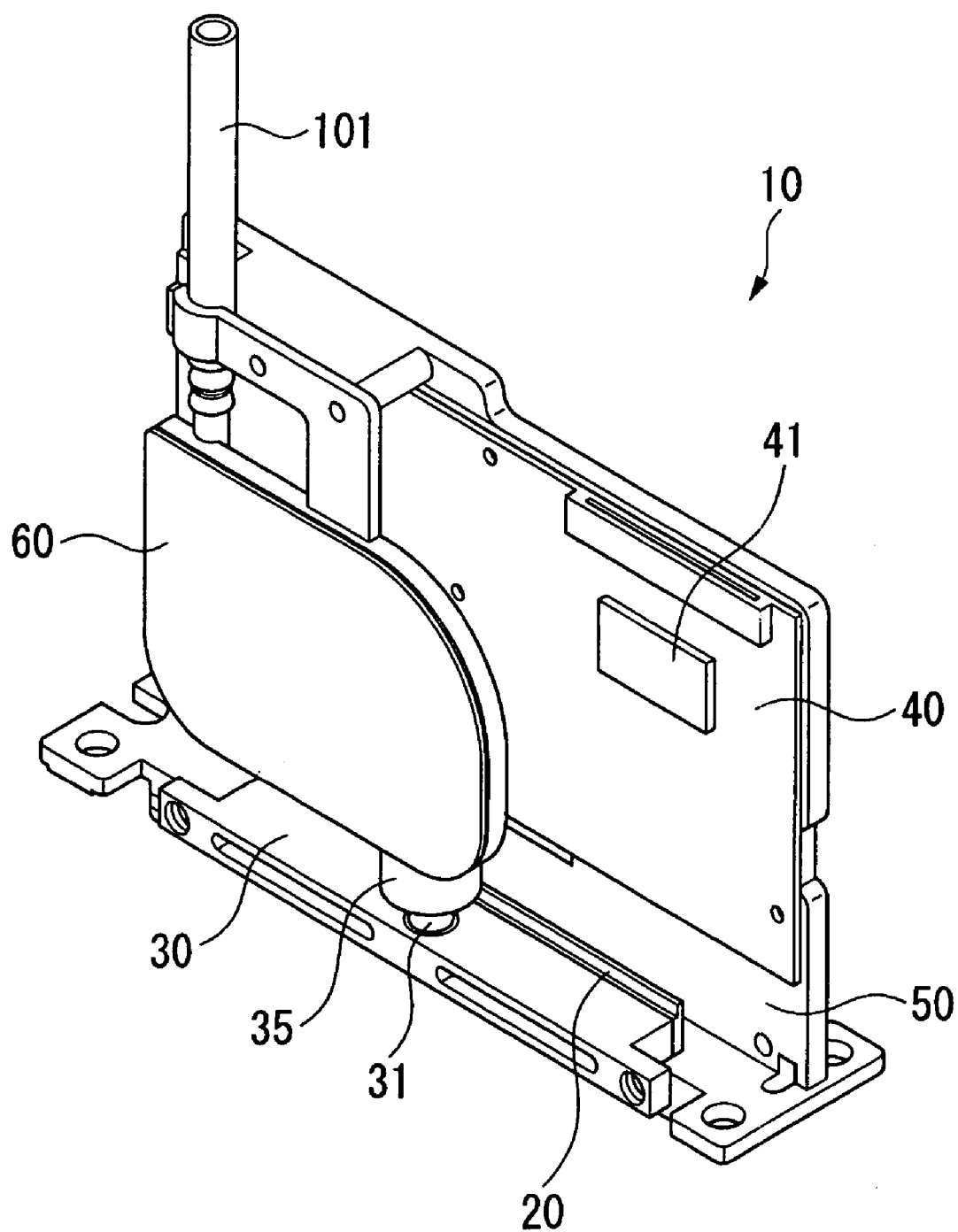
FIG. 2 is a perspective view of an ink jet head according to the first embodiment.

An example ink jet head that discharges ink will now be explained. FIG. 2 is a perspective view of an ink jet head according to the first embodiment, and FIG. 3 is an exploded perspective view of an ink jet head chip.

As shown in FIG. 2, the ink jet head 10 for this embodiment includes: an ink jet head chip 20; a flow path substrate 30, provided on one side of the ink jet chip 20; and a wiring substrate 30, on which is mounted a drive circuit 41 for driving the ink jet head chip 20. These members are fixed to a base plate 50, which is a head support member made, for example, of aluminum. Further, these members are coupled together by using a thermal conductive adhesive or double-sided tape.

Figure 3A:
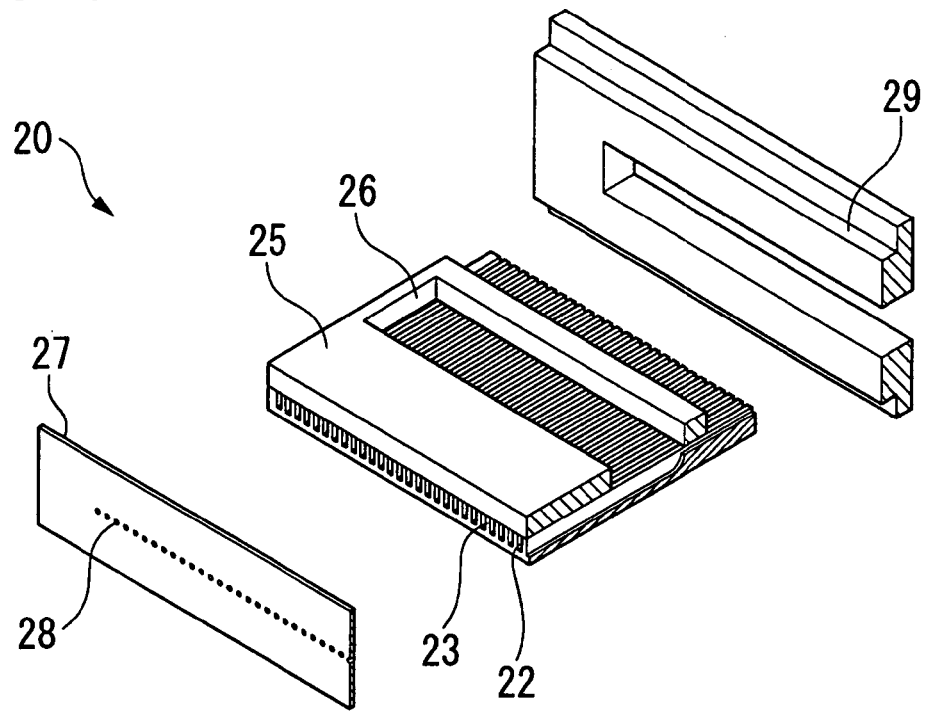
FIGS. 3A and 3B are exploded perspective views of an ink jet head chip according to the first embodiment.
Figure 3B:
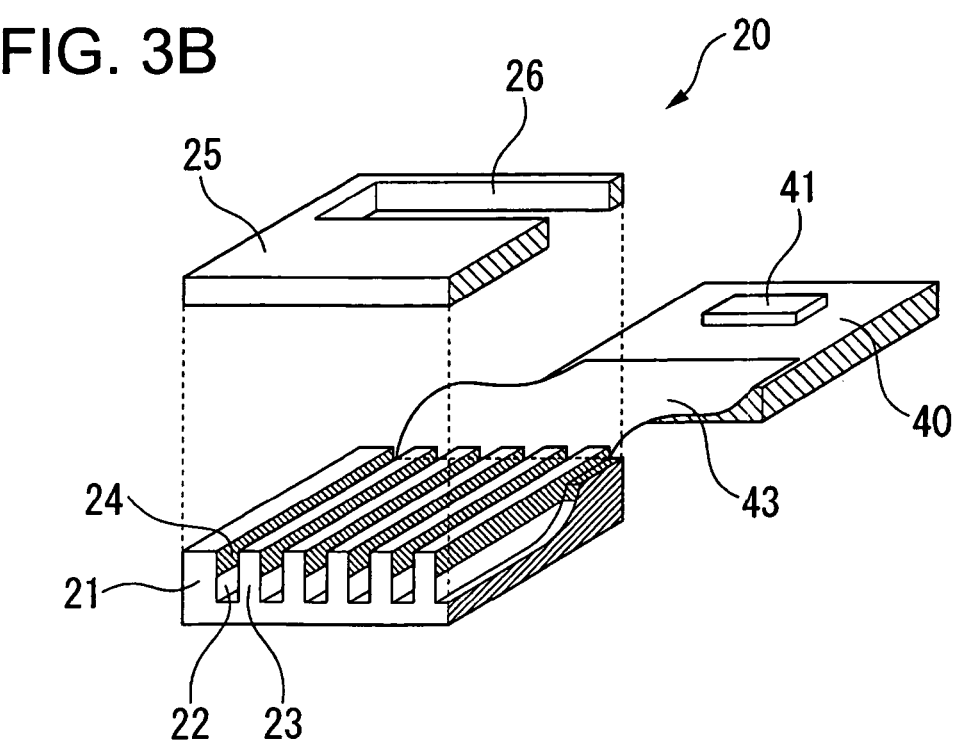

A piezoelectric ceramic plate 21 that constitutes the ink jet head chip 20 is made, for example, of PZT (lead zirconate titanate), and a plurality of ink chambers 22 that communicate with nozzle openings 28 are formed in parallel in the piezoelectric ceramic plate 21. The individual ink chambers 22 are separated by side walls 23. The longitudinal ends of the ink chambers 22 are extended to one end face of the piezoelectric ceramic plate 21, while the other ends are not extended to the other end face, and the depths of the chambers 22 are gradually reduced. Further, on the side walls 23 in the widthwise direction of the ink chambers 22, electrodes 24 that independently output drive signals for the ink chambers 22 are formed in the longitudinal direction on the open side of the ink chambers 22 (FIGS. 3A and 3B).

The ink chambers 22 are formed in the piezoelectric ceramic plate 21 by a disc-like die cutter, for example, and the portions wherein the depth is gradually reduced are formed by using the shape of a die cutter. Further, the electrodes 24 are formed in the individual ink chambers 22, for example, by a well known vapor deposition performed in the oblique direction. As described above, the ink jet head chip 20 of this embodiment includes the side walls, made of PZT, and the ink chambers 22 (grooves) between them, and employs a shared wall structure wherein a plurality of actuators for discharging ink are arranged by sharing the side walls 23 (FIG. 3B).

Further, an ink chamber plate 25 is connected to the piezoelectric ceramic plate 21 where the ink chambers 22 are open. A common ink chamber 26 is formed that penetrates the ink chamber plate 25 and covers all the parallel arranged ink chambers 22.

A nozzle plate 27 is coupled to one end of the assembly composed of the piezoelectric ceramic plate 21 and the ink chamber plate 25, and nozzle openings 28 are formed at locations in the nozzle plate 27 consonant with those of the ink chambers 22. The method for manufacturing the nozzle plate 27 will be described in detail later. Further, in order to prevent the attachment of ink, a water-repellent film is deposited on the face of the nozzle plate 27 opposite the recording medium S (FIG. 3A).

In this embodiment, a nozzle support plate 29 is peripherally located near one end face of the assembly composed of the piezoelectric ceramic plate 21 and the ink chamber plate 25. The ink jet head chip 20 is provided by fitting and adhering the nozzle support plate 29 to the assembly consisting of the side face of the nozzle plate 27 and to the assembly consisting of the piezoelectric ceramic plate 21 and the ink chamber plate 25.

Furthermore, the flow path substrate 30 is connected to one side of the ink chamber plate 25 (the upper face in FIG. 3), and one side of the common ink chamber 26 is sealed by this flow path substrate 30. Specifically, the flow path substrate 30 is adhered to one side of the ink chamber plate 25, and is fixed to the base plate 50 by a screw member (not shown), for example.

In addition, a coupling portion 31 is provided for the upper face of the flow path substrate 30, and is connected, for example, via an O ring to an ink channel tube 35 provided for a pressure adjustment unit 60. The other end of the pressure adjustment unit 60 is connected via the ink supply tube 101 to an ink tank, such as an ink cartridge, to provide temporarily storage for a predetermined amount of ink.

The drive circuit 41 and another control circuit are mounted on the surface of the wiring substrate 40, and wire bonding, or wireless bonding, for example, is employed to establish an electrical connection with the terminals of the drive circuit 41, which is an IC chip, to drive lines 43 that are to be connected to the electrodes 24 of the ink jet head chip 20.

With this arrangement, a print signal, based on print data, is transmitted from the drive circuit 41 to the electrodes 24 to induce distortion of the side walls 23. Then, the volumes of the ink chambers 22 are changed, and impelled by the change in the pressure in the ink chambers 22 at this time, ink in the ink chambers 22 is discharged from the nozzle openings 28 onto the recording medium S.

Figure 4:
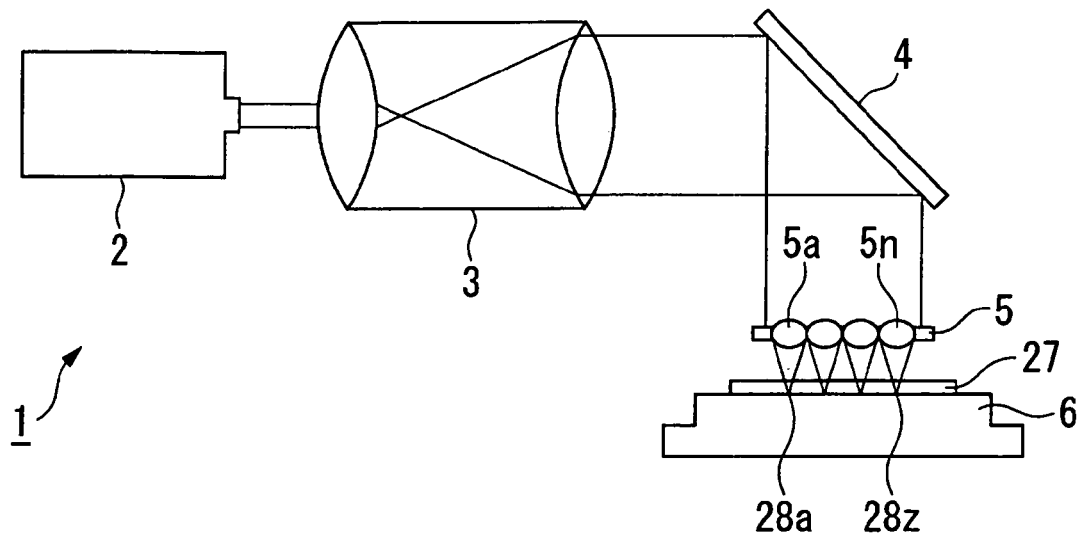
FIG. 4 is a schematic diagram showing a nozzle plate manufacturing apparatus according to the first embodiment.

An explanation will now be given for a method and an apparatus for manufacturing the nozzle plate 27 used for the ink jet head 10 for this embodiment. FIG. 4 is a schematic diagram showing a nozzle plate manufacturing apparatus for this embodiment.

In a nozzle plate manufacturing apparatus 1, a laser beam is generated by a laser beam source, which in this embodiment, is an excimer laser device 2 that emits an excimer laser beam that is one kind time of ultraviolet light. As the excimer laser beam used here, a KrF ray having a wavelength of 248 nm, an XeCl ray having a wavelength of 308 nm or an XeF ray having a wavelength of 351 nm is especially preferable. Further, a excimer laser device 2 for which the energy radiation intensity can be controlled is employed. Furthermore, the laser bean is not output constantly, but is repeatedly emitted in short pulse cycles.

The excimer laser beam emitted by the excimer laser device 2 is transmitted to a magnifying optical system 3. The magnifying optical system 3 is means for expanding, widening a narrow laser beam, and the size of the beam can be changed in accordance with the area of a target object to be processed.

The laser beam passed through the magnifying optical system 3 is guided in a desired direction by a mirror 4. In this case, a plurality of mirrors 4 may be provided, as needed. In this embodiment, a laser beam that has been reflected in a direction perpendicular to the light axis of the magnifying optical system 3 is directed toward the upper face of an X-Y stage 6, which is object conveying means.

A micro lens array 5, wherein a plurality of micro lenses 5a to 5n are arranged on the same plane, is located above the X-Y stage 6. The laser beam magnified by the magnifying optical system 3 can collectively scan all the micro lenses 5a to 5n of the micro lens array 5. Then, the laser beam is split by the individual micro lenses 5a to 5n, and the beams are individually focused on a plurality of points on the nozzle plate 27 that is mounted as the target object on the X-Y stage 6. The diameters of the micro lenses 5a to 5n of the micro lens array 5 and the arrangement of these lenses 5a to 5b will be described later in detail. Further, the lens diameter for the micro lens array 5 can be changed in accordance with a desired diameter for a nozzle opening, and since the focal distance is varied, depending on the diameter and the thickness of the lens, the vertical position of the micro lens array 5, relative to the light axis, can be adjusted by a vertical moving mechanism (not shown).

In this embodiment, the position of the X-Y stage 6 can be adjusted by moving in the directions X-Y, in order to align the positions of the nozzles 28a to 28z, formed in the nozzle plate 27, with the focal positions of the micro lenses 5a to 5n. Further, as will be described later, during the process for forming the nozzle openings 28a to 28z, the X-Y stage 6 is moved parallel to the direction in which the array of micro lenses 5a to 5n is disposed. Furthermore, instead of providing the vertical moving mechanism for the micro lens array 5, as described above, the X-Y stage 6 may be so designed that adjustment of its vertical position is enabled.

For this embodiment, an explanation will now be given for the principle according to which micro lenses are employed to form the tapered nozzle openings 28 in the nozzle plate 27.

The excimer laser beam emitted by the excimer laser device 2 is condensed through the micro lens array 5, and focused on the nozzle plate 27. Specifically, the focus is adjusted to near the lower face of the nozzle plate 27, and cylindrical holes having a beam diameter consonant with the diameter of a micro lens penetrate the nozzle plate 27 and serve as the nozzle openings 28.

Figure 5:
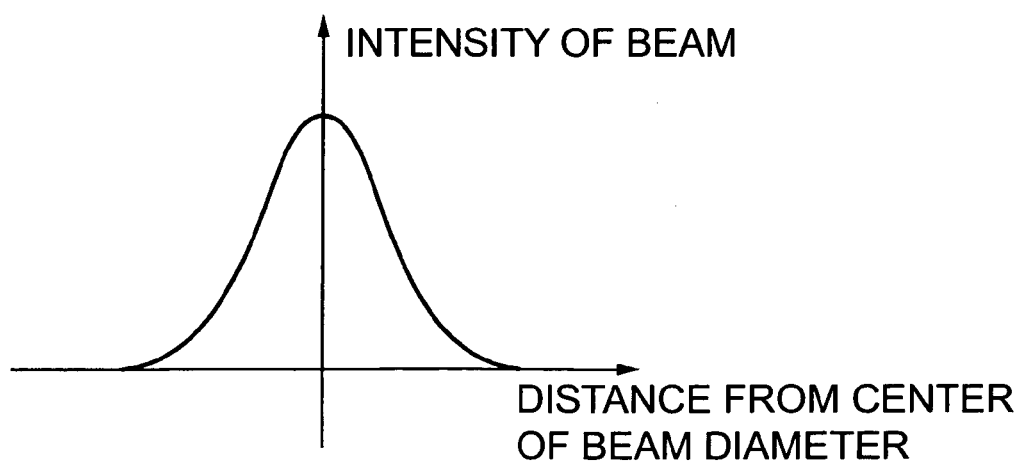
FIG. 5 is a graph related to the distance from the center of a beam and the intensity of the beam.

The intensity of the excimer laser is not uniform across the diameter of the beam, and as shown in FIG. 5, Gaussian distribution is obtained wherein the greater the distance from the center of the beam diameter, the lower the intensity. Therefore, when a one pulse excimer laser beam is emitted, a deep hole is formed in the center area for the nozzle openings 28, while only a shallow hole is formed near the outer edge of the beam diameter, because the beam intensity is low and the processing efficiency is poor. By emitting such an excimer laser beam for several seconds, however, nozzle openings 28 having a desired shape can be obtained. Further, the tapered shape of a nozzle opening can be changed by designating an arbitrary amount of laser radiation and an arbitrary focal distance.

Figure 6A:
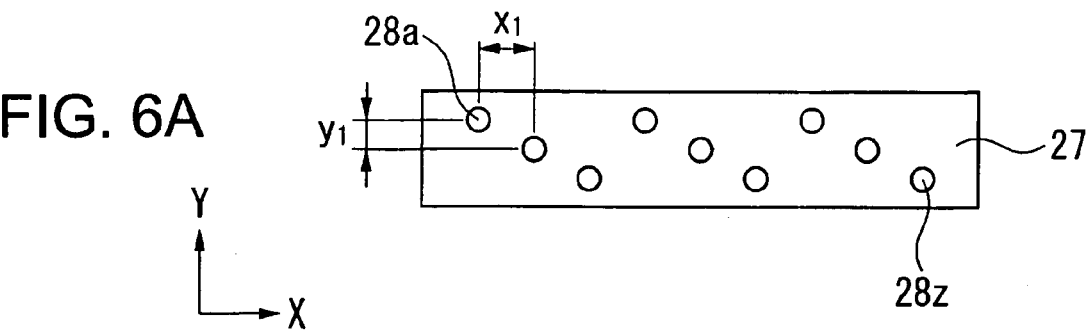
FIGS. 6A and 6B are schematic diagrams showing a nozzle plate and a micro lens array according to the first embodiment.
Figure 6B:
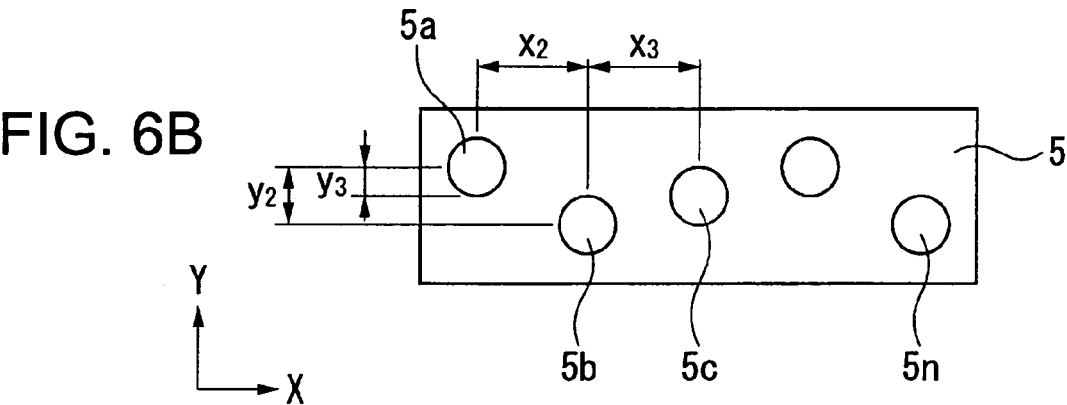

The nozzle plate 27 that is produced in the first embodiment of the invention will now be described. The nozzle plate 27 is formed of a polyimide film about 50 μm to 75 μm thick. FIG. 6A is a diagram showing the nozzle plate 27 of this embodiment, and FIG. 6B is a diagram showing the micro lens array 5 of this embodiment. The longitudinal length (length in direction X in FIG. 6A) of the nozzle plate 27 differs depending on the specifications for the ink jet head 20, and in this embodiment, equal to or greater than 20 mm is defined as the size because the nozzle plate 27 in this embodiment is for large-sized paper. The nozzle openings 28 are formed in the longitudinal direction of the nozzle plate 27, normally at a pitch of from 90 dpi to 360 dpi. Specifically, when printing is to be performed at a pitch that is a multiple of 360 dpi or 300 dpi, the nozzle openings 28 are formed at a pitch of a multiple of 90, 100, 150 or 180 dpi.

Further, it is preferable that, to perform accurate printing, the nozzle openings 28 be formed at a pitch equal to or greater than 360 dpi. For this, narrow grooves must be formed for the ink chambers 22, and thin side walls 23 are also required. However, when the side walls 23 are too thin, they may be broken by distortion due to the application of a voltage to the electrodes 24. Therefore, it is preferable that the pitch for arranging the nozzle openings 28 for this embodiment be equal to or smaller than 360 dpi. Furthermore, as will be explained in detail later, when nozzle openings 28 having a larger diameter on the ink supply side are to be formed at a fine pitch, the tapered portion of an nozzle opening 28 may overlap the adjacent nozzle opening 28. Therefore, a pitch of about 180 dpi is preferable for the arrangement of the nozzle openings 28. When the nozzle openings 28 are formed at a pitch of 180 dpi, in the direction of the array, the distance (x1 in FIG. 6A) between the adjacent nozzle openings 28 is 141.1 μm.

Since the ink jet head 20 of this embodiment employs the shared wall structure wherein adjacent ink chambers 22 share the side wall 23, ink is discharged in a three-nozzle cycle.

Therefore, as shown in FIGS. 6A, every three nozzle openings 28 are arranged obliquely in the nozzle plate 27. However, the arrangement of the nozzle openings 28 is not limited to this one. Further, in this embodiment, the distance (y1 in FIG. 6A) in the direction perpendicular to the direction in which the adjacent nozzle openings 28 are arranged is very short, i.e., about 11 μm, and these nozzle openings 28 appear to be substantially linearly aligned. In FIG. 6A, to simplify the explanation given for the drawings, only several nozzle openings 28 are shown. Actually, however, multiple nozzle openings 28 are formed in the nozzle plate 27, in the longitudinal direction, and for this embodiment, 512 are provided.

In this embodiment, the nozzle opening 28 is a circle that in cross section has a diameter of about 15 to 50 μm on the ink discharge side (the ink outlet side), and a circle that in cross section has a diameter of about 40 to 90 μm on the ink chamber side (the ink inlet side). The diameters of the nozzle openings can be arbitrary designated in accordance with the amount of ink to be discharged, and in this embodiment, the diameter on the discharge side is 25 μm and the diameter on the ink chamber side is 50 μm.

The micro lenses 5a to 5n used for this embodiment will now be described. The micro lenses 5a to 5n employed for this embodiment have the same lens diameter, i.e., 150 μm to 1 mm. Further, the diameter of the nozzle opening 28 to be processed is changed in accordance with the lens diameter of the micro lenses 5a to 5n. For example, when the lens diameter is smaller than 150 μm, satisfactory energy can not be obtained, and the obtained diameter of the nozzle opening 28 on the discharge side is equal to or smaller than 15 μm. Further, since the focal distance is shortened, a variance in the thickness of the nozzle plate 27 greatly affects the accuracy of the tapering process, and during the processing, shavings may fly into the lenses.

When the lens diameter is greater than 1 mm, the affect produced by a variance in the thickness of the nozzle plate 27 is lessened. However, the beam diameter is increased and fine machining of the nozzle openings 28 is disabled. Therefore, a lens diameter of 150 μm to 1 mm is preferable when nozzle openings 28 are to be formed that have the diameters described in the embodiment. Further, a lens diameter of about 280 μm is even more preferable, especially when the above described nozzle openings 28 that are to be formed have a discharge side diameter of 25 μm and an ink chamber side diameter of 50 μm, and are to be arranged at a pitch of 180 dpi. When micro lenses 5a to 5n having this diameter are employed, the affect produced by a lens aberration can be reduced to equal to or smaller than 0.1 μm, and accurate forming of the nozzle openings 28 is enabled.

While referring to FIG. 6B, an explanation will now be given for the arrangement of the micro lenses 5a to 5n in the micro lens array 5 of this embodiment. FIG. 6A is a diagram showing the micro lens array 5 that is employed to form the nozzle plate 27 shown in FIG. 6A.

The micro lens array 5 of this embodiment is provided by arranging the micro lenses 5a to 5n on the same plane. At this time, the micro lenses 5a to 5n are arranged in direction X in FIG. 6B, which corresponds to the longitudinal direction of the micro lens array 5. The longitudinal length (the length in direction X in FIG. 6B) of the micro lens array 5 is substantially equal to or greater than the longitudinal length of the nozzle plate 27, i.e., equal to or greater than 20 mm. The pitch for arranging the micro lenses 5a to 5n in the micro lens array 5 is an integer multiple of the pitch for the nozzle openings 28 formed in the nozzle plate 27. Specifically, in this embodiment, a pitch x2 between micro lenses that are adjacent in the direction in which they are arranged is twice a pitch x1 for adjacent nozzle openings 28. When the pitch for arranging the micro lenses is an integer multiple of the pitch for the nozzle openings 28, micro lenses having a large diameter can be employed, so that a large amount of the excimer laser beam can be condensed and the nozzle openings 28 can be efficiently and stably formed.

As this integer N is increased, micro lenses 5a to 5n having a large diameter can be employed. However, since the number of processes is also increased, the productivity is reduced. Therefore, it is more. preferable that the integer N be from two to four.

Moreover, in this embodiment, a pitch y2, between the micro lens 5a and the adjacent micro lens 5b in the direction (direction Y in FIG. 6B) perpendicular to that in which the micro lenses are arranged, is twice a pitch y1 between adjacent nozzle openings 28 in the direction perpendicular to that in which the micro lenses are arranged. Further, a distance y3 for the micro lens 5a and for the micro lens 5c, which is adjacent, on the side opposite that of the micro lens 5a, to the micro lens 5b located between the micro lenses 5a and 5c in the direction perpendicular to that in which the micro lenses are arranged, is equal to the pitch y1 for the adjacent nozzle openings 28. By repeating the arrangement used for these three micro lenses, sets of three nozzle openings 28 each, as shown in FIG. 6A, can be easily formed.

Figure 7:
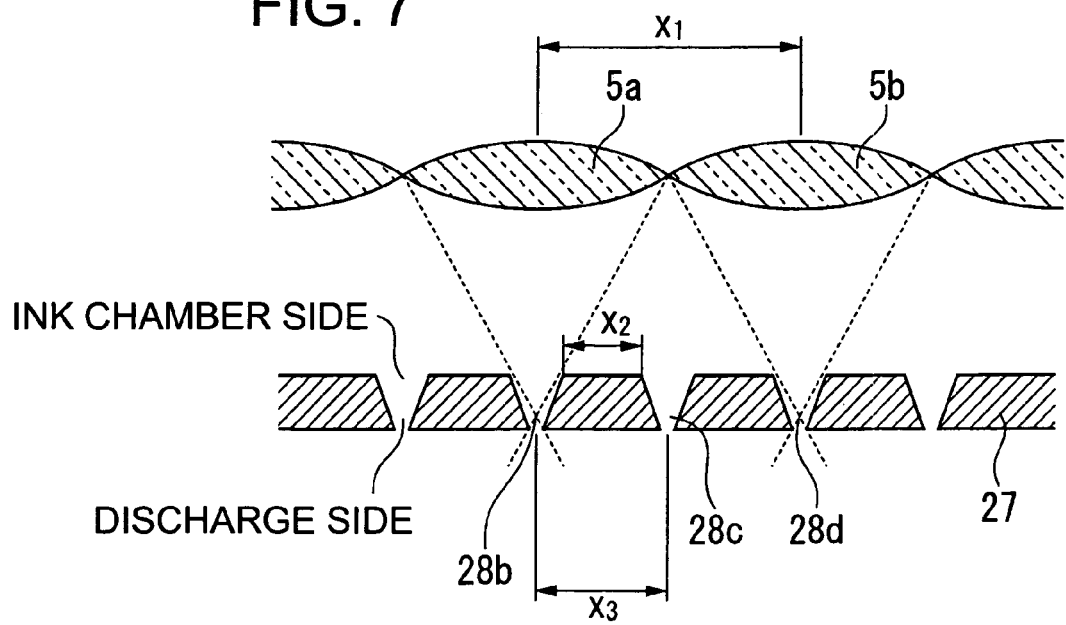
FIG. 7 is a cross-sectional view of the state of the micro lenses and the nozzle plate during a process.

Specifically, a micro lens unit is provided by a plurality of micro lenses that are shifted relative to each other in the direction perpendicular to that in which the micro lenses are arranged. For the micro lens array 5 of this embodiment, multiple micro lens units are arranged in the direction in which the micro lenses are arranged. That is, the micro lenses 5a, 5b and 5c in FIG. 6B constitute one micro lens unit, and a plurality of such micro lens units are arranged in the direction in which the micro lenses are arranged An explanation for this embodiment will now be given for (i) the relationship of the nozzle pitch, the micro lens diameter and the integer N, (ii) the relationship of the nozzle pitch and the ink chamber side diameter of the nozzle opening, (iii) the relationship of the micro lens diameter, the resolution and the integer N, and (iv) the relationship of the ink chamber diameter of the nozzle opening and the resolution. FIG. 7 is a cross-sectional view of the state of the micro lenses 5a and 5b and the nozzle plate 27 when the nozzle openings 28 are formed using the integer N=2. The nozzle openings 28b to 28d are formed in the nozzle plate 27, and the ink chamber sides (upper faces in FIG. 7) of the nozzle openings 28 are large circles, and the discharge sides (lower faces in FIG. 7) are small circles. Furthermore, in this case, to simplify the explanation, assume that the nozzle openings 28 and the micro lenses 5a and 5b are aligned linearly.

When the resolution, for example, is 360 dpi, the nozzle pitch (x3) is 70.6 μm in the direction in which the nozzle openings 28 are arranged in the nozzle plate 27. When at this time N=2 is employed, the pitch (x1) in the direction in which the micro lenses are arranged is 141.2 μm. When the nozzle pitch is 70.6 μm, the ink chamber side diameter of the nozzle opening 28 must be equal to or smaller than this value, because when the diameter on the ink chamber side is greater, the distance (x2) between the nozzle openings 28 would become zero. As is apparent from this, in order to increase the resolution of a recording medium, the nozzle pitch must be reduced, and a small nozzle diameter must be designated. Accordingly, the diameter of the micro lens to be employed must also be reduced. Therefore, while the adjacent ends of the micro lenses 5a and 5b in FIG. 7 contact, when small micro lenses are employed, they may not.

When the resolution is designated as 90 dpi, the nozzle pitch (x3) is 282.2 μm, and the diameter of the nozzle opening 28 on the ink chamber side is smaller than the maximum diameter of 90 μm. Therefore, when the resolution is low, nozzle openings 28 having a large diameter can be formed by employing micro lenses having a large diameter. In this embodiment, the case wherein N=2 has been explained; however, the same explanation can be applied when the integer N is other than 2.

In conclusion, the above described relationships are represented by using the following expressions:

(i) The relationship of the nozzle pitch (μm), the micro lens diameter (μm) and the integer N is $$\text{micro lens diameter} \leq N \times \text{nozzle pitch}$$

(ii) The relationship of the nozzle pitch (μm) and the ink chamber side diameter (μm) of the nozzle opening is $$\text{ink chamber side diameter of the nozzle opening} < \text{nozzle pitch}$$

Further, when one inch=25.4 mm, and when the resolution (dpi)=25400/nozzle pitch, the above expression is rewritten as follows.

(iii) The relationship of the micro lens diameter (μm), the resolution (dpi) and the integer N is $$\text{micro lens diameter} \leq N \times 25400/\text{resolution}$$

(iv) The relationship of the ink chamber side diameter (μm) of the nozzle opening and the resolution (dpi) is $$\text{ink chamber side diameter of the nozzle opening} < 25400/\text{resolution}$$

Therefore, in order to manufacture a nozzle plate 27 having a desired nozzle pitch (or resolution), the numerical values should be determined for the micro lens diameter and the ink chamber side diameter for the nozzle opening that satisfy the above described expressions. Further, in accordance with the accuracy and the diameter of the tapered portion, an integer N range is also determined that satisfies the above expressions.

The function of the micro lens array 5 of this embodiment will now be described by referring to the steps for processing the nozzle plate 27 by employing the micro lens array 5. FIGS. 8A to 8C are diagrams showing the states for the processing of the nozzle plate 27 using the micro lens array 5 shown in FIG. 6B.

In FIG. 8A, the positional relationship between the nozzle plate 27 and the micro lens array 5 before the processing is shown. In FIG. 8A, the micro lens array 5 and the nozzle plate 27 are parallel; however, the micro lens array 5 is actually secured above the upper face of the nozzle plate 27 at a distance equivalent to the focal distance of the micro lenses 5a to 5e, specifically, 3 to 5 μm in this embodiment. The positions indicated by broken-line circles in FIG. 8A are where nozzle openings 28a to 28i are to be formed. In the state represented in FIG. 8A, when an excimer laser beam is emitted for several seconds in the descending direction from the upper face of the micro lens array 5, the nozzle openings 28a, 28c, 28e, 28g ad 28i, as indicated by solid-line circles in FIG. 8B, are formed at locations in the nozzle plate 27 opposite the micro lenses 5b to 5f. In this embodiment, since the pitch for arranging the micro lenses is twice that of the pitch for arranging the nozzle openings 28, every other nozzle opening 28 is formed during a single processing step.

Then, the X-Y stage 6 whereon the nozzle plate 27 is mounted is moved in the direction parallel to that in which the micro lenses are arranged and repositioned. Specifically, in this embodiment, the nozzle plate 27 is moved, in the direction indicated by an arrow X in FIG. 8B, a distance equivalent to four times the pitch used for arranging the nozzle openings 28. When the excimer laser beam is again emitted for several seconds, as shown in FIG. 8C, the nozzle openings 28b, 28d, 28f and 28h are formed at positions in the nozzle plate 27 opposite the micro lenses 5a to 5d.

As described above, for the micro lens array 5 of this embodiment, the pitch between the micro lenses that are adjacent in the direction in which the micro lenses are arranged is an integer multiple of the pitch for arranging the adjacent nozzle openings 28. Therefore, when the number of times the excimer laser beam is employed for machining is the same as this integer, a nozzle plate 27 can be provided that has accurately positioned nozzle openings 28. Specifically, in this embodiment, since the pitch for the micro lenses is twice that for the nozzle openings, two excimer laser machining processes must be performed to manufacture a nozzle plate having desired tapered portions.

Figure 9A:
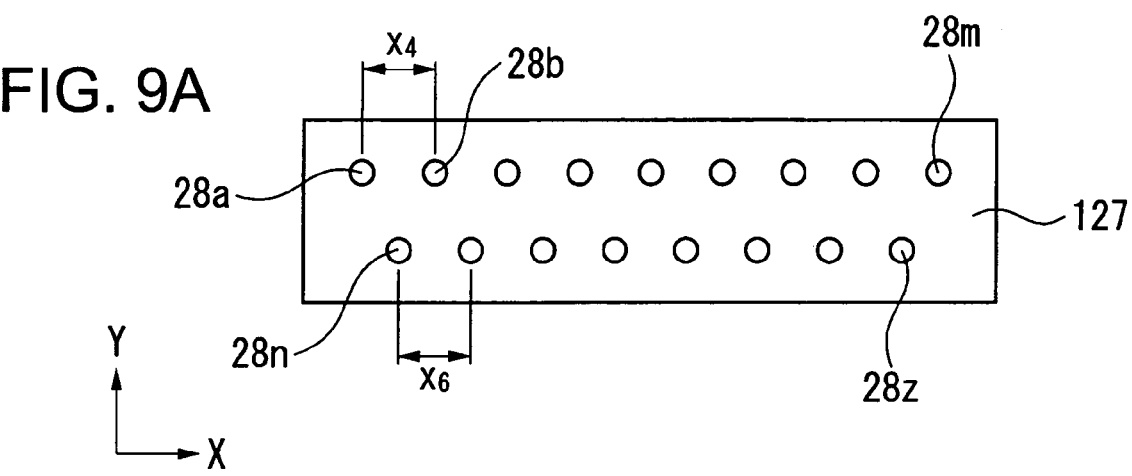
FIGS. 9A and 9B are schematic diagrams showing a nozzle plate and a micro lens array according to a second embodiment of the present invention.
Figure 9B:
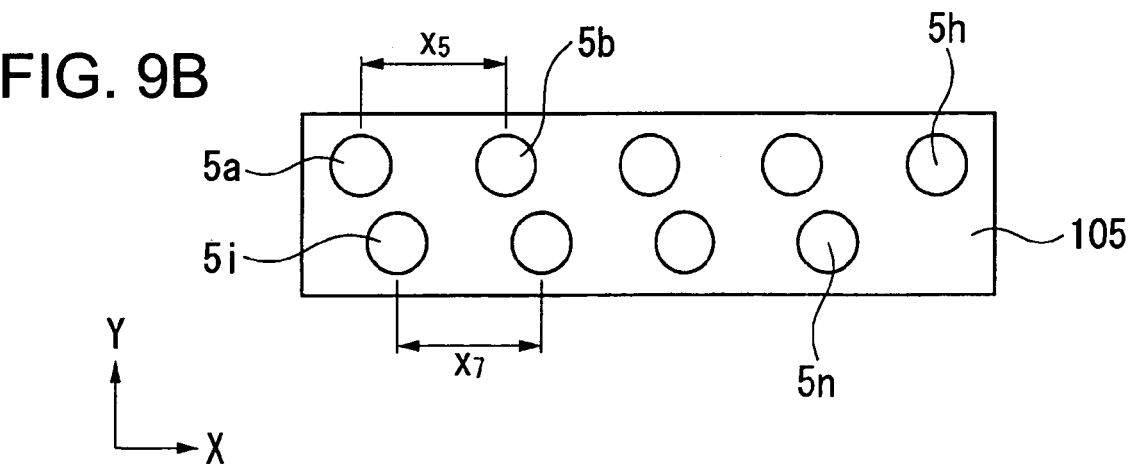
Figure 10:
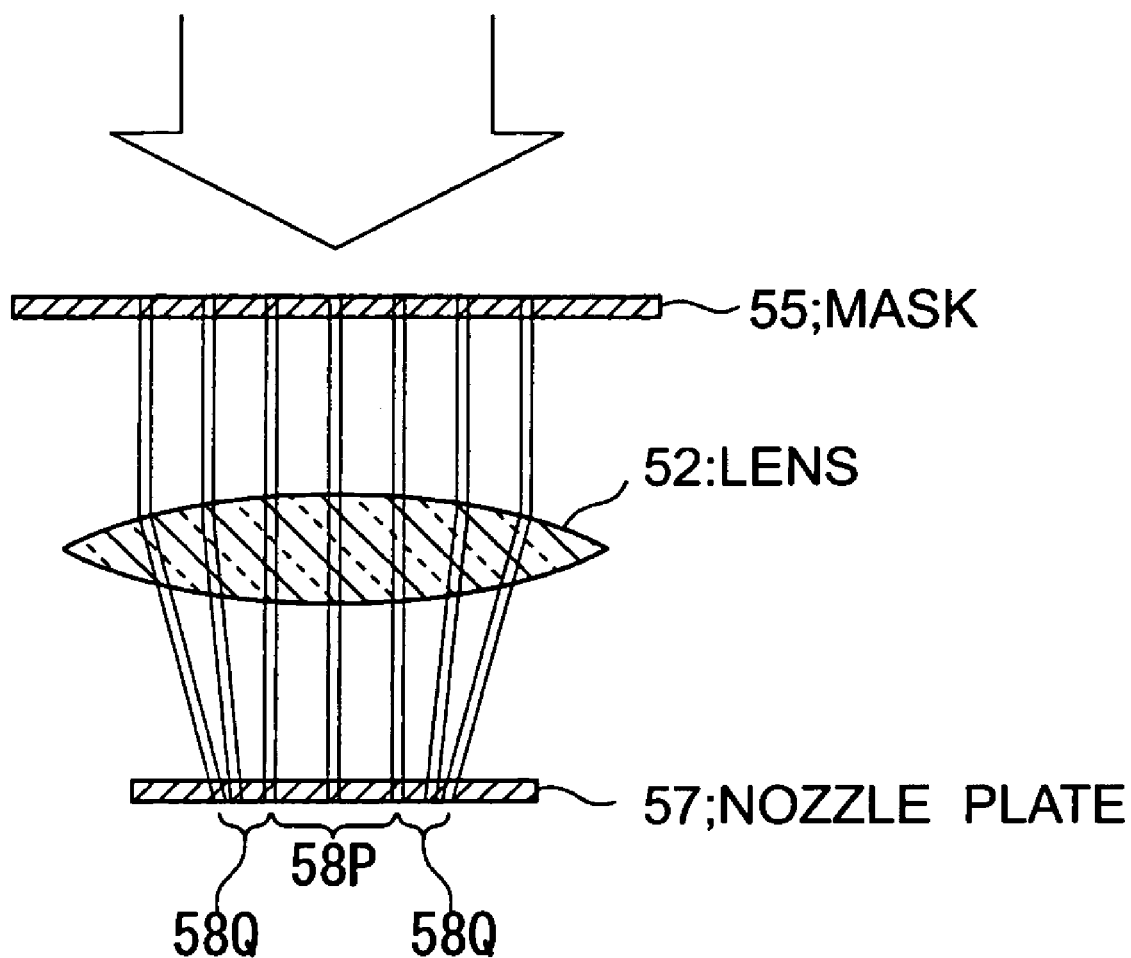
FIG. 10 is a diagram showing a conventional method used for machining a nozzle plate.

As a second embodiment of the present invention, a micro lens array 105 shown in FIG. 9B can be employed to manufacture a nozzle plate 127. For the nozzle plate employed for the second embodiment, two arrays of nozzle openings 28a to 28z are arranged in a zigzag manner. For the second nozzle opening array (28n to 28z), the position of the nozzle opening 28n in the nozzle plate 127 in the nozzle array direction (the direction indicated by an arrow X in FIG. 9A) is the middle of the nozzle opening 28a and the nozzle opening 28b that are adjacent to each other in the first nozzle opening array (28a to 28m). Therefore, when the two nozzle opening arrays are formed in the above described zigzag manner, the ink discharge density can be doubled, compared with when a single array of the nozzle openings 28 is formed. Further, as in the first embodiment, the micro lens array 105 used for this embodiment includes a plurality of micro lenses 5a to 5n arranged on the same plane. These micro lenses 5a to 5n are also arranged in a zigzag manner, in consonance with the nozzle openings 28a to 28z.

Furthermore, for the micro lenses 5a to 5n of this embodiment, as well as for those of the first embodiment, the pitch between micro lenses, which are linearly adjacent in the direction in which the nozzle openings are arranged in the nozzle plate 127, is an integer multiple of the pitch between the nozzle openings that are linearly adjacent in the direction in which the nozzle openings are arranged in the nozzle plate 127. Further, for machining efficiency, it is more preferable that this integer be two to four.

In this embodiment, specifically, for the micro lenses 5a to 5h (first micro lens array) that are linearly aligned in the direction in which the nozzle openings are arranged in the nozzle plate 127, the pitch (x5 in FIG. 9B) between the adjacent micro lenses is twice the pitch (x4 in FIG. 9A) of the adjacent nozzle openings of the corresponding nozzle openings 28a to 28m (first nozzle opening array) that are linearly aligned in the nozzle plate 127 in the direction in which the nozzle openings are arranged.

Similarly, for the micro lenses 5i to 5n (second micro lens array) that are linearly aligned in the direction in which the nozzle openings are arranged in the nozzle plate 127, the pitch (x7 in FIG. 9B) between the adjacent micro lenses is twice the pitch (x6 in FIG. 9A) of the adjacent nozzle openings of the corresponding nozzle openings 28n to 28z (second nozzle opening array) that are linearly aligned in the nozzle plate 127 in the direction in which the nozzle openings are arranged. In this embodiment, since the pitch of the first nozzle opening array is the same as the pitch of the second nozzle opening array, accordingly, the pitch of the first micro lens array is equal to the pitch of the second micro lens array.

As described above, in the nozzle plate 127 wherein multiple arrays of nozzle openings 28 are formed, the pitch for arranging the micro lenses need only be an integer multiple of the pitches for the nozzle openings of each array in the direction in which the nozzle openings are arranged in the nozzle plate. Thus, a satisfactory laser beam can be obtained, and desired nozzle openings can be formed.

Further, in the nozzle plate 127 of this embodiment, the nozzle openings 28a to 28m and the nozzle openings 28n to 28z are formed linearly to respectively provide the first nozzle opening array and the second nozzle opening array. However, the present invention is not limited to this. As in the first embodiment, the first and second opening arrays may be formed by repetitively, obliquely arranging individual sets of three nozzle openings. In this case, in the same manner as in the first embodiment, the first micro lens array and the second micro lens array are formed by shifting, in the direction Y, the micro lenses 5a to 5h and the micro lenses 5i to 5n as individual units of three lenses.

Furthermore, in the explanation for the first embodiment, the nozzle plate 27 has been employed for the ink jet head 10 wherein a pair of electrodes 24 are provided on the side wall 23 of each ink chamber 22. However, the nozzle plate produced by the manufacturing method of this invention is not limited to this. For example, an ink jet head may be employed wherein a dummy ink chamber that is not to be filled with ink is formed between individual ink chambers that are to be filled with ink. In this case, a one-to-one correspondence is not established between the nozzle openings and the ink chambers. However, the manufacturing method of this invention can be applied for the manufacture of a nozzle plate.

In addition, the nozzle plate produced by the nozzle plate manufacturing method of the invention can be applied not only for an ink jet head wherein electrodes are formed on the side walls of ink chambers that communicate with nozzle openings, but also an ink jet head wherein pressure generation devices are separately provided, in consonance with the ink chambers.

The nozzle plate produced by the nozzle plate manufacturing method of the invention can also be employed not only for an ink jet head that discharges ink by employing a piezoelectric device, but also a thermal type ink jet head that employs a heat generating device to heat the ink in ink chambers, and discharges ink droplets.

Further, in the present invention, a serial ink jet recording apparatus wherein an ink jet head moves in the main scanning direction has been explained as an example. However, the present invention is not especially limited to this type of apparatus, and can also be applied for another type, such as a line type ink jet recording apparatus wherein a fixed ink jet head is employed.

Moreover, in the nozzle plate manufacturing apparatus of the invention, a laser beam emitted by the excimer laser apparatus has been magnified by the magnifying optical system and emitted to the micro lens array. However, the present invention is not limited to this, and nozzle openings may be formed in a nozzle plate by scanning performed with a laser beam. According to the present invention, since there is no lens aberration affect because the micro lens array is employed, uniform nozzle openings can be still formed by scanning performed with a laser beam.

What is claimed is:

1. An ink jet head nozzle plate manufacturing method, comprising the steps of:
  generating a laser beam using a laser beam source;
  changing a direction of the laser beam using a mirror that reflects the laser beam;

condensing the laser beam reflected by the mirror using a plurality of micro-lenses disposed in an arrangement direction on a common plane; and forming a plurality of nozzle openings in a nozzle plate using the laser beam condensed by the plurality of micro-lenses by intermittently moving at least one of the nozzle plate or the micro-lenses in the arrangement direction of the micro-lenses, an integer multiple of a pitch between adjacent ones of the micro-lenses in the arrangement direction thereof being two to four times a pitch between adjacent ones of the nozzle openings.

2. An ink jet head nozzle plate manufacturing method according to claim 1; wherein the generating step comprises generating an excimer laser beam.

3. An ink jet head nozzle plate manufacturing method according to claim 1; further comprising the step of magnifying the laser beam using a magnifying optical system before reflection of the laser beam by the mirror.

4. An ink jet head nozzle plate manufacturing method, comprising:

providing a nozzle plate; and forming a plurality of nozzle openings in the nozzle plate by irradiating an upper surface of the nozzle plate with a laser beam passing through a plurality of micro-lenses disposed in an arrangement direction on a common plane while intermittently moving at least one of the nozzle plate or the micro-lenses in the arrangement direction of the micro-lenses, a pitch between adjacent ones of the micro-lenses in the arrangement direction being an integer multiple of two to four times a pitch between adjacent ones of the nozzle openings formed in the nozzle plate.

5. An ink jet head nozzle plate manufacturing apparatus comprising:

a laser beam source that generates a laser beam;

a mirror that reflects and changes a direction of the laser beam;

a plurality of micro-lenses that condense the laser beam that is reflected by the mirror to form on a nozzle plate a plurality of nozzle openings located on a common plane between the mirror and the nozzle plate; and a nozzle plate moving unit for intermittently moving the nozzle plate parallel to an arrangement direction of the micro-lenses while the nozzle openings are formed on the nozzle plate;

wherein an integer multiple of a pitch between adjacent ones of the micro-lenses in the arrangement direction thereof is two to four times the pitch between adjacent ones of the nozzle openings.

6. An ink jet head nozzle plate manufacturing apparatus according to claim 5; wherein the laser beam is an excimer laser beam.

7. An ink jet nozzle plate manufacturing apparatus according to claim 5; wherein the plurality of micro-lenses comprises a plurality of first micro-lenses; and further comprising a micro-lens array comprised of a plurality of micro-lens units having a plurality of micro-lenses for reflecting the laser beam reflected by the mirror, one of the micro-lens units being constituted by the plurality of first micro-lenses and at least one other of the micro-lens unit being constituted by a plurality of second micro-lenses shifted from the plurality of first micro-lenses in a direction perpendicular to the arrangement direction of the plurality of first micro-lenses.

8. An ink jet head nozzle plate manufacturing apparatus comprising:

a laser beam source that generates a laser beam;

a mirror that reflects and changes a direction of the laser beam;

a plurality of micro-lenses that condense the laser beam reflected by the mirror for forming a plurality of nozzle openings in a nozzle plate, the micro-lenses being arranged on a common plane between the laser beam source and the nozzle plate; and a nozzle plate moving unit for moving the nozzle plate parallel to an arrangement direction of the micro-lenses, an integer multiple of a pitch between adjacent ones of the micro-lenses in the arrangement direction thereof being two to four times the pitch between adjacent ones of the nozzle openings.

9. An ink jet head nozzle plate manufacturing apparatus according to claim 8; further comprising a magnifying optical system that magnifies the laser beam before the laser beam is reflected by the mirror.

10. An ink jet head nozzle plate manufacturing apparatus according to claim 8; wherein the plurality of micro-lenses comprises a plurality of first micro-lenses; and further comprising a micro-lens array comprised of a plurality of micro-lens units having a plurality of micro-lenses for reflecting the laser beam reflected by the mirror, one of the micro-lens units being constituted by the plurality of first micro-lenses and at least one other of the micro-lens unit being constituted by a plurality of second micro-lenses shifted from the plurality of first micro-lenses in a direction perpendicular to an arrangement direction of the plurality of first micro-lenses.

11. An ink jet head nozzle plate manufacturing apparatus according to claim 8; wherein the laser beam is an excimer laser beam.

* * * * *